United States Patent [19]

Rabe

[11] Patent Number: 5,190,713
[45] Date of Patent: Mar. 2, 1993

[54] PROCESS FOR THE PRODUCTION OF A ROLLER BEARING CAGE WITH MOLDED-ON SPRING ELEMENTS

[76] Inventor: Juergen Rabe, Sterperedorfer Muehle, D-8522 Hoechstadt, Fed. Rep. of Germany

[21] Appl. No.: 690,932
[22] PCT Filed: Oct. 23, 1990
[86] PCT No.: PCT/DE90/00805
  § 371 Date: Jun. 20, 1991
  § 102(e) Date: Jun. 20, 1991
[87] PCT Pub. No.: WO91/06784
  PCT Pub. Date: May 16, 1991

[30] Foreign Application Priority Data

Oct. 24, 1989 [DE] Fed. Rep. of Germany ....... 3935295

[51] Int. Cl.$^5$ .............................................. B29C 45/00
[52] U.S. Cl. ............................ 264/328.1; 29/898.049; 29/898.05
[58] Field of Search .............. 264/328.1, 328.12, 328.2; 29/398.049, 398.05, 398.054, 398.055

[56] References Cited

U.S. PATENT DOCUMENTS

| | | |
|---|---|---|
| 3,260,333 | 7/1966 | Bensen et al. |
| 3,537,554 | 11/1970 | Elmore. |
| 3,795,382 | 3/1974 | Gruber et al. ................. 249/60 |
| 3,863,742 | 2/1975 | Elmore et al. |
| 3,937,312 | 2/1976 | Gehrke. |
| 3,993,176 | 11/1976 | Marola et al. |
| 4,588,314 | 5/1986 | Anscher ....................... 384/539 |
| 4,654,181 | 3/1987 | Brandenstein et al. ....... 264/328.12 |
| 4,668,209 | 5/1987 | Kyoosei et al. .............. 264/328.12 |
| 4,747,900 | 5/1988 | Angus ........................ 264/328.12 |
| 4,915,201 | 4/1990 | Stark et al. ................. 192/45 |

FOREIGN PATENT DOCUMENTS

| | | |
|---|---|---|
| 0176767 | 4/1986 | European Pat. Off. |
| 1286843 | 2/1963 | Fed. Rep. of Germany. |
| 1625744 | 1/1970 | Fed. Rep. of Germany. |
| 1954642 | 3/1971 | Fed. Rep. of Germany. |
| 2948239 | 8/1981 | Fed. Rep. of Germany. |
| 1396281 | 3/1965 | France. |
| 2643427 | 8/1980 | France. |

OTHER PUBLICATIONS

"Selbstverstaerkende Polymere", *Technische Rundschau*, 18/89; Von Dietrich Fleischer und Guenther Kirsch, Seiten 21-31.

*Primary Examiner*—Jill L. Heitbrink
*Attorney, Agent, or Firm*—Sixbey, Friedman, Leedom & Ferguson

[57] ABSTRACT

A process for producing a rolling bearing cage with cast-on spring elements, in particular of a pinch roll free engine clutch, with a rolling bearing cage for guiding the rolling bearings. The cage is made by casting two rims, interconnected by several webs with parallel axes, onto each side of the rolling bearings. According to the invention, each spring element (7,8) is cast onto the corresponding web (4) by a large spring foot (14). Each spring foot (14) is used directly as a casting-on site (15) or the adjacent web or the region (16) between the spring foot (14) and the adjacent web (4) is used as the casting-on site (15). The flow cross-section of the spring foot (14) is greater than the flow cross-section of the spring elements(s) (7,8). The polymer material used is a self-reinforcing plastic containing liquid crystals.

5 Claims, 2 Drawing Sheets

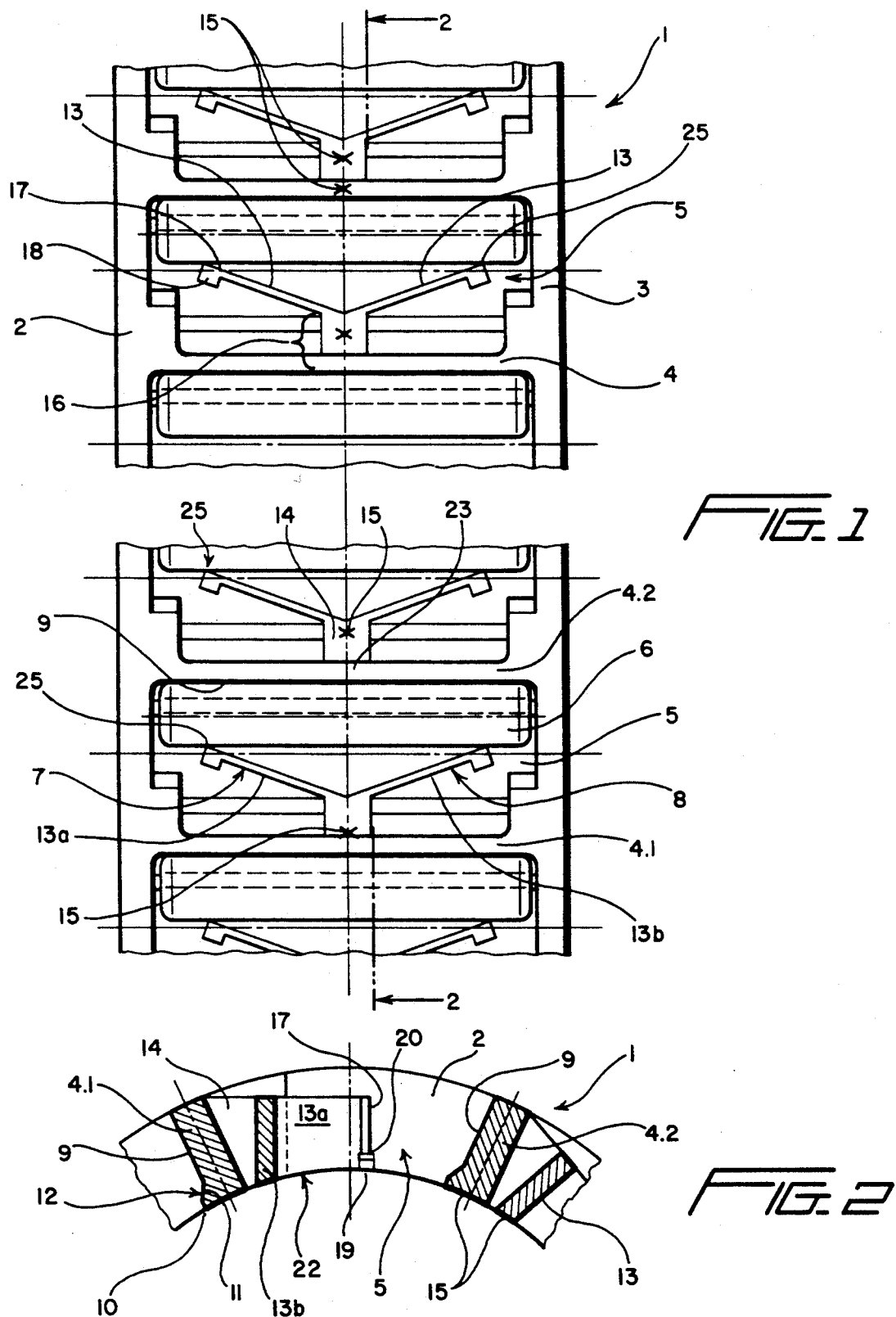

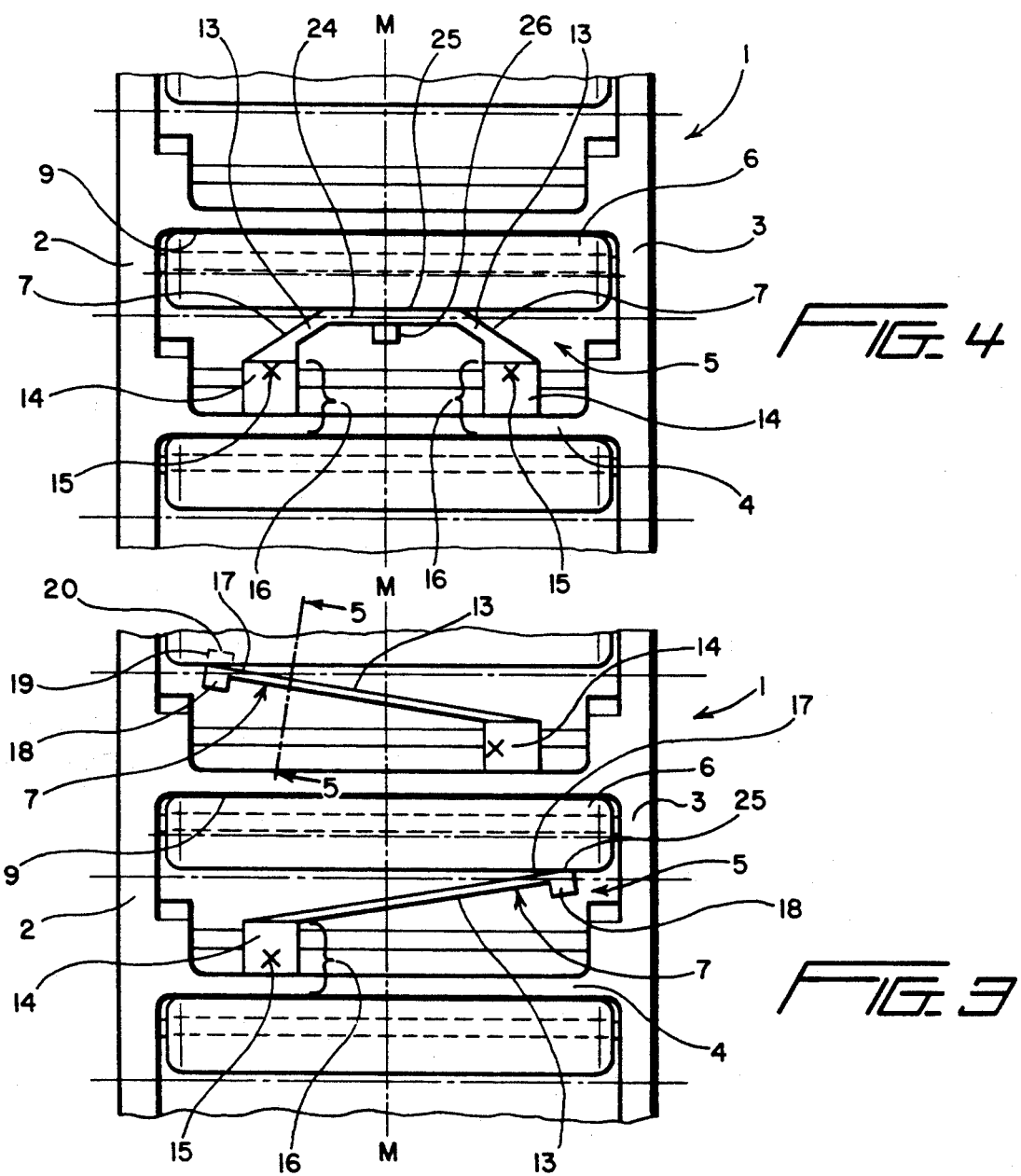
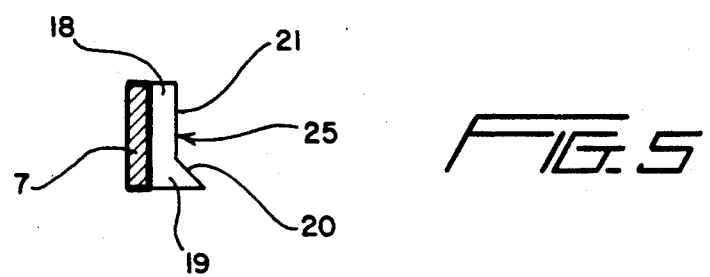

PROCESS FOR THE PRODUCTION OF A ROLLER BEARING CAGE WITH MOLDED-ON SPRING ELEMENTS

This invention relates to a process for the production of a roller bearing cage or a roller bearing needle ring with molded-on spring elements, especially of a grip roller overrunning clutch and to a roller bearing cage thus produced.

From German Aulegesschrift 286 843 a cage is known for guiding the grip rollers of a grip roller overrunning clutch, which consists of two guide rings (shoulders), placed on both sides of the grip rollers, connected to one another by several axis-parallel webs. On each web a ramp is molded on one side and on the other side a leaf spring for prestressing the grip rollers. The cage with the leaf springs is injection molded from elastic plastic in one piece. These and other cages on the market are produced with injection molds or casting molds, in which the sprues are provided in the area of the guide rings or shoulders or in the transition area between the shoulders and the webs. This type of gate or position of the sprues leads to a laminar flow of the polymer material used, which does not make possible a specific orientation of the molecule chains and of the perhaps embedded reinforcement fibers in the area of the spring elements.

With this invention the object is to be achieved of indicating a process for the production of a roller bearing cage with molded-on spring elements and to configure a roller bearing cage thus produced so that spring tension of the spring elements is increased in comparison with known embodiments, especially the spring rigidity of the spring element or spring elements that are molded on is substantially improved.

This object is achieved by the process steps or features indicated below which include:

The common use of the process steps
molding of the spring elements on the web by a large-volume spring base, and
each spring base is used directly or the adjacent web or the area between the spring base and the adjacent web is used as gate and further
the flow channel of the spring base is dimensioned greater in volume than the flow channel of the spring element or elements branching off on the spring base, and finally
a self- or internally reinforcing plastic or a polymer blend or a compound of several plastics with liquid crystal portions is used as polymer material which allows the spring element or elements to polymerize in the flow direction as molecules with specific orientation.

The following advantages, in comparison with the previously known processes for the production of such roller bearing cages or roller bearing needle rings are:

The flash formation at the separation sites of the mold is considerably reduced, since polymer material used because of the arrangement and design of the gates promotes the orientation molecules in the flow direction, at the same time makes possible the use of polymer materials with low viscosity and preferably also the casting with lower specific pressures. Moreover, with the polymer materials used the polymerization process is completed comparatively quickly. The cold flow tendency or creep effect of these polymer materials with the use of the process according to the invention is unusually small, which also leads to improved spring characteristics.

It is to be expected that with the roller bearing cages produced according to the process of the invention the spring characteristic values of the molded-on spring elements are substantially improved, especially at least a doubling of the spring rigidity as a function of the test temperature in comparison with known spring elements is to be expected.

Other advantageous details of the invention are claimed in the subclaims and are described in greater detail in the following description by the embodiments illustrated in the drawing:

There are shown in:

FIG. 1, a top view of a development of a roller bearing cage with two spring elements per web;

FIG. 2, a view according to section A—A of FIG. 1, but not in the development but as a segment of a roller bearing cage, FIG. 3, a top view of a development of a roller bearing cage with one spring element per web and laterally shifted molded-on site, FIG. 4, a top view of a development of a roller bearing cage with two spring elements combined in a common pressure element and FIG. 5, a view of section B—B of FIG. 3.

The one-piece roller bearing cage 1, molded or injection molded from polymer material, namely elastic plastic, consists of two annular shoulders 2, 3, which are connected to one another by axis-parallel webs 4. Between webs 4 are formed chambers 5 into which one roller 6 each is inserted, which in the present embodiment is represented as a cylindrical roller.

Instead of cylindrical or needle-shaped rollers other elongated rollers, namely in the form of cones, conical segments, barrels or the like can also be used. Rollers 6, as represented in FIG. 1, are pressed by two spring elements 7 and 8 molded on a web 4.1 bordering chamber 5 against wall 9 of the other web 4.2 bordering chamber 5.

Webs 4 have on wall 9 on edge 10, located inside adjacent to a shaft to be inserted, a ramp 11 with surface 12 preferably running obliquely.

Spring part 13 of spring elements 7, 8 is preferably designed like a spring strip, i.e., a leaf spring. The spring element 13 on web 4.1 have been designated 13a and 13b to facilitate the identification thereof in FIG. 2.

According to the invention spring elements 7, 8 are molded on by a large-volume base 14 on web 4. In FIG. 1, gate sites 15, indicated with the symbol "X," can be provided for each web 4 in an area 16 between web 4 and spring base 14. Thus it is possible to place gate sites 15 either directly on spring base 14, in the transition area spring base 14 and web 4 or only on web 4.

A self- or internally reinforcing plastic with liquid crystal portions, especially on a base of thermotropic liquid crystal LC polymers, such as polyazomethines, polyesters, polyester amides, polyester carbonates, polyester imides, polythiol esters or the like, is used as polymer material. These polymer materials can advantageously be mixed with fiber materials, for example glass fibers, carbon fibers, mineral fibers, metal fibers, metal oxide fibers, textile fibers, fibers made from plastics or on a ceramic base or the like.

These polymer materials also include polymer blends or compounds made from several plastics, which, depending on need, exhibit amorphous and/or partially crystalline structures and are proportionally mixed with the above-described liquid crystal plastics to be able to perform a specific determination of the spring characteristic by a change of the oriented portions.

According to the invention each spring base 14 is dimensioned so that its flow channel in comparison with the flow channel of spring element or elements 7 or 8 is greater, for example, 1.5 to 3 times greater in volume. By this embodiment of spring base 14, identified in this application as "large-volume," and by suitable selection of gate sites 15 within area 16 between spring base 14 and adjacent web 4, using said special plastics with liquid crystal portions, it is achieved that the plastic used at least in the area of springy part 13 of spring elements 7, 8 forms molecules oriented in the flow direction during polymerization. In this way, a reinforcement of the spring tension and an improvement of the spring characteristic of spring elements 7, 8 are achieved. Moreover, by the use of said plastics it is possible to reduce the casting or injection pressure in the mold to a pressure between 5 and 900 bars. Because of this reduced casting or injection pressure and the low viscosity of the plastics used the flash formation is also reduced or even largely eliminated. In known production processes of roller bearings with molded-on spring elements the casting or injection pressure is 1000 to 1500 bars.

According to a preferred configuration of the invention a melt block 18 with a flow channel greater than that of springy part 13 can be molded on free end 17 of spring elements 7, 8. A good flow of springy part 13 of spring elements 7, 8 is achieved by this measure, by which the advantageous specific orientation of the molecules is even promoted in the polymerization of the plastic used. A ramp 19, directed toward roller 6, with preferably oblique surface 20 can be provided, i.e., molded on, on melt block 18, comparable as on web 4. This side 21, provided with ramp 19, of melt block 18 at the same time is designed as bearing surface 25 for roller 6 (FIG. 5).

Gate sites 15 are preferably provided on cage inside 22 (FIG. 2).

Spring base 14, forming the spring base of the two spring elements 7, 8, is provided in or approximately in center 23 of web 4 in FIGS. 1 and 2. A spring element 7, 8, running toward each shoulder 2, 3, is provided toward both sides. Springy part 13 of spring elements 7, 8 runs almost axially to cage 1, namely at an acute angle, preferably in the range between 5° to 15°. In this case represented cylindrical roller 6 is pressed against related web 4 or its wall 9 in the end areas by the bearing surfaces of spring elements 7, 8 or by blocks 18 located there. The two spring elements 7, 8 extend up to approximately shoulders 2, 3.

In the embodiment represented in FIG. 3 spring base 14 or spring base point on web 4 is shifted laterally toward one shoulder 2 or the other shoulder 3 and related spring element 7 respectively points in the direction of other shoulder 3 or 2.

According to the embodiment shown in FIG. 4 near each shoulder 2 or 3 is provided a spring base 14, from which one spring element 7 each runs in the direction of the center, i.e., they are directed towards one another. The free spring ends of these spring elements 7 can either act individually at pressure element or they can be connected to one another by a common spring clip 24, as FIG. 4 shows. In addition to or instead of spring elements 7 pointing toward the center, outward pointing spring elements can be provided on laterally shifted spring bases 14, as represented in FIG. 1.

Preferably, another block 26, represented in broken lines, pointing to spring bases 14, can be provided in the center of common spring clip 24, a block with which a confluence plane in the area of spring clip 24 can be avoided. Spring bases 14 in the embodiment of FIG. 4 can optionally also be placed only on the left or right of median plane M, in a manner comparable to the embodiment in FIG. 3.

Bearing surfaces 25 on free spring ends 17 of spring elements 7, 8, namely melt blocks 18 or common spring clip 24, are designed so that the clamping force transmitted by them to roller 6 runs at least approximately 90° to the molecular orientation of the plastic molecules in spring elements 7, 8 or in their springy parts 13.

In view of the specific orientation in spring elements 7, 8 of the elongated molecule chains in the sense that these molecule chains basically run parallel to one another, thus extend at least approximately in the direction of spring elements 7, 8, comparatively high spring constants or spring tensions are obtained, which guarantee a reliable pressing of rollers 6 on the respective webs 4. Consequently, it is sufficient for many purposes to use the self- or internally reinforcing plastics used directly, i.e., to get by without fibrous reinforcement particles. But, of course, the process according to the invention does not rule out the use of such reinforcement fibers.

It is important that the orientation of the molecule chains of the polymer materials used and optionally the reinforcement fibers occupy at least approximately an angle of 90° to at most 120° to the spring tension acting on spring elements 7, 8. This promotes substantially improved spring rigidity or increased spring tensions in comparison with the usually produced spring elements 7, 8.

I claim:

1. Process for the production of a one-piece roller bearing cage having a pair of annular shoulders that are connected together by webs that run parallel to a central longitudinal axis of the bearing cage, a first side of each web having a molded-on ramp for holding a respective roller bearing and an opposite side of each web carrying at least one molded-on spring element for pressing a respective roller bearing toward a facing first side of an adjacent web, the spring element being connected to the web via a spring base; comprising the steps supplying a flow of an elastic polymer material, selected from the group consisting of self- or internally reinforcing plastics, a polymer blend, and a compound of several plastics with liquid crystal portions, through a gate directly into a respective flow channel that defines the spring base area of a respective spring element, the spring base flow channel having a large volume in comparison to that of a flow channel that defines the spring element; and polymerizing the polymer material with the molecules thereof being oriented in a direction of flow of the material into the spring element flow channel from the spring base flow channel.

2. Process according to claim 1, wherein a termptropic liquid crystal polymer from the group consisting of polyazomethines, polyesters, polyester amides, polyester carbonates, polyester imides, and polythio esters is used as said polymer material.

3. Process according to claim 1 wherein said polymer material is supplied to said gates at a casting pressure in the pressure range of 5 to 900 bars.

4. Process according to claim 1, wherein a melt block is molded on a free end of said at least one mold-on spring element.

5. Process according to claim 4, wherein a ramp with an obliquely sloping surface is molded on said melt block on a side facing away from said web.

* * * * *